US008627711B1

(12) United States Patent
Hall et al.

(10) Patent No.: US 8,627,711 B1
(45) Date of Patent: Jan. 14, 2014

(54) SENSOR SWITCH FOR CHEMICAL/COMPOSITION DETECTION

(76) Inventors: Richard H. Hall, Homer Township, Midland County, MI (US); Daniel F. Hall, Homer Township, Midland County, MI (US)

( * ) Notice: Subject to any disclaimer, the term of this patent is extended or adjusted under 35 U.S.C. 154(b) by 272 days.

(21) Appl. No.: 13/068,468

(22) Filed: May 12, 2011

Related U.S. Application Data

(60) Provisional application No. 61/395,685, filed on May 14, 2010.

(51) Int. Cl.
*G01N 11/00* (2006.01)
(52) U.S. Cl.
USPC ........................................................ 73/53.01
(58) Field of Classification Search
USPC .................................. 73/53.01, 53.06, 60.11
See application file for complete search history.

(56) References Cited

U.S. PATENT DOCUMENTS

| | | | |
|---|---|---|---|
| 4,605,923 A | 8/1986 | Marshall | |
| 4,663,614 A * | 5/1987 | Rauchwerger | 340/605 |
| 6,559,771 B2 * | 5/2003 | Landis | 340/603 |
| 7,117,732 B2 * | 10/2006 | Curello et al. | 73/149 |
| 7,694,582 B2 * | 4/2010 | Hayakawa et al. | 73/849 |
| 7,698,936 B2 * | 4/2010 | Curello et al. | 73/149 |
| 7,704,750 B2 | 4/2010 | Hall et al. | |
| 7,862,779 B2 | 1/2011 | Flor et al. | |
| 8,079,247 B2 * | 12/2011 | Russell et al. | 73/12.01 |
| 2007/0048876 A1 | 3/2007 | Flor et al. | |
| 2007/0084293 A1 * | 4/2007 | Kaiserman et al. | 73/763 |
| 2008/0108142 A1 | 5/2008 | Hall et al. | |

OTHER PUBLICATIONS

Technical Foam Services Blog, "Rigid foams, reticular foams and other foam products," Aug. 5, 2010 A.D., www.technicalfoamservices.co.uk/ . . . , downloaded May 9, 2011, one page.
Heard, David B./EPA, "Fail Safe Devices for the Prevention of Hazardous Materials Spills," Project Summary, 4 pp., Jan. 1985.

* cited by examiner

*Primary Examiner* — Helen Kwok
(74) *Attorney, Agent, or Firm* — Christopher John Rudy

(57) ABSTRACT

Sensor switch includes a compromisable mechanical restrainer and a biased member. Before compromise, the restrainer can hold the biased member in a first position. When contacted with a target chemical and/or composition, the restrainer is physically compromised by being softened or dissolved such that the biased member can assume a second position different from the first position. Monitoring a sample for a target chemical and/or composition can be carried out with the sensor switch.

20 Claims, 1 Drawing Sheet

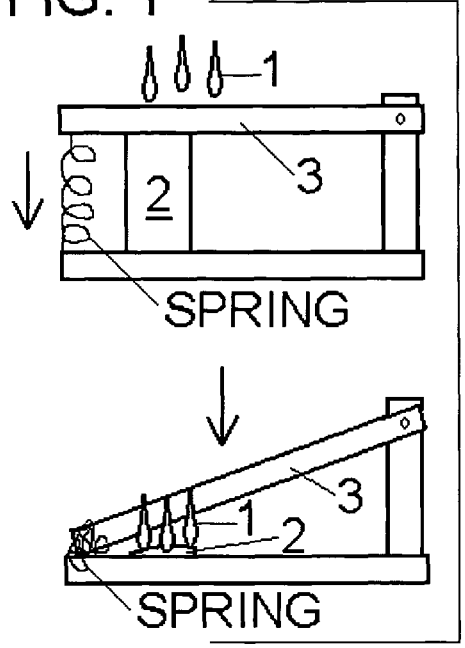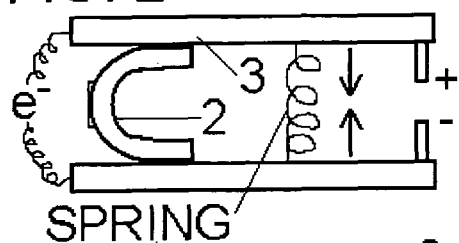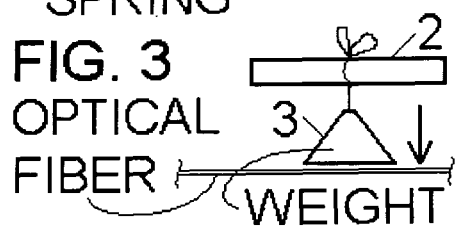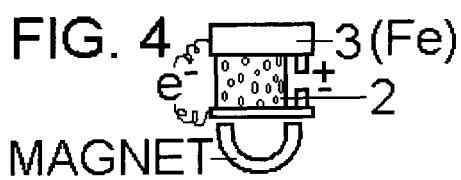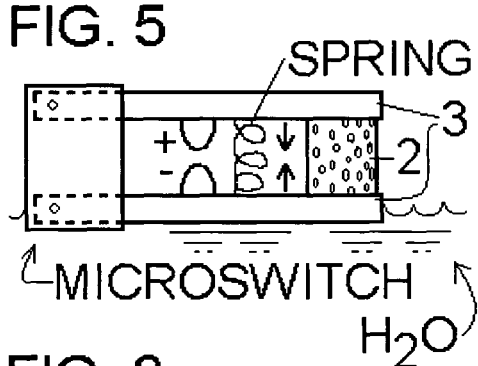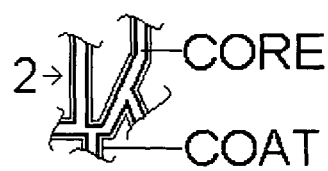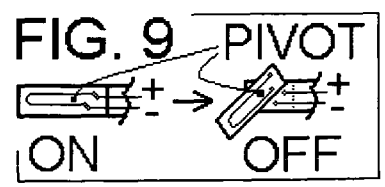

SENSOR SWITCH FOR CHEMICAL/COMPOSITION DETECTION

This claims benefits under 35 USC 119(e) of U.S. provisional patent application No. 61/395,685 filed on May 14, 2010 A.D. The specification of that application, of course to include its drawings, is incorporated herein by reference in its entirety.

FIELD AND PURVIEW OF THE INVENTION

This concerns, in purview, a device with a compromisable mechanical restrainer, which holds a biased member in a first position. When contacted with a target chemical and/or composition it is physically compromised by being softened or dissolved such that the biased member assumes a second position different from the first position. The device can be employed in a method for monitoring for the target.

BACKGROUND TO THE INVENTION

Detection of organic contaminants released in spills is a concern.

Detection systems can employ dyes that change color when contacted by a contaminant. See, e.g., Pat. Pub. Nos. US 2007/0048876 A1 and US 2008/0108142 A1, now U.S. Pat. No. 7,862,779 B2 and U.S. Pat. No. 7,704,750 B2, respectively.

U.S. Pat. No. 4,605,923 discloses a method and apparatus for detection of organic fluids. In nature and gist, it has a pair of strips of fabric-like material joined together at one end in overlapping fashion by a bond formed from an organic fluid imbibing material sorbed into the common ends of the strip. The imbibing material is a latex polymer such as a tertiary-alkylstyrene. When the organic fluid contacts the bonded joint the imbibing material softens. A tensile force may be applied across the bonded joint by a resilient member that may be connected to a mechanism for actuating electrical circuitry to signal the disjoining of the strips when the joint is softened sufficiently by the presence of the organic fluid.

Another detection system involves a ship and booms with sensors set out away from the ship. The booms carry certain electronic sensors for detection of certain chemicals that send a signal back to the ship if detected. Such is very expensive.

It would be desirable to improve upon and/or provide alternative(s) to the art.

A FULL DISCLOSURE OF THE INVENTION

Provided, in general, is a device comprising a compromisable mechanical restrainer and a biased member, wherein, before compromise, the restrainer can hold the biased member in a first position, and, upon contact with a target chemical and/or composition, the restrainer is physically compromised by being softened or dissolved such that the biased member can assume a second position different from the first position. Provided further is a method for monitoring a sample for a target chemical and/or composition, which comprises providing the aforesaid device having its restrainer in the first position before compromise; and introducing the device to the sample—such that, when contacted with a target chemical and/or composition, the restrainer is physically compromised by being softened or dissolved such that the biased member assumes a second position different from the first position for detection of the target.

The invention is useful in substance detection and monitoring.

Hereby, the art is advanced in kind. A simple, reliable alternative is provided for detection of contaminant or other target substances. Targets can vary. The device may be a fail-safe switch. The compromise switch responds to target fluid of interest without electronic or visual false alarms. Even dilute or very small amounts of a target can be effectively sensed. It can be light weight to float on water, where certain target organics may be found as in an oil spill. Expended or out of date devices can be readily repaired or replaced with fresh ones. The invention is highly efficient not only technically but economically as well. Numerous further advantages attend the invention.

The drawings form part of the specification hereof. With respect to the drawings, which are not necessarily drawn to scale, the following is briefly noted:

FIG. 1 shows a sensor switch for chemical/composition detection, in use.

FIGS. 2-5 show additional sensor switches for chemical/composition detection.

FIGS. 6-8 show various restrainers for sensor switches for chemical/composition detection, with FIGS. 6 and 7 foamed plastic plugs and FIG. 8 a coated reticular foam.

FIG. 9 shows a member of a sensor switch hereof, as in use.

FIG. 10 shows another sensor switch hereof, which includes a protective housing.

The invention can be further understood by the detail set forth below. The detail that follows, which may be read in view of the drawings, as with the foregoing, is to be taken in an illustrative but not necessarily limiting sense.

In general, solubility parameter(s) of target substance(s) 1, say, a liquid, may be employed to select material(s) for restrainer 2. In general, a foamed solid plastic can be used in or as the restrainer 2, for instance, with polystyrene for detecting generally nonpolar aliphatic and aromatic target substances, for example, hexane, benzene, oil, diesel fuel, kerosene and/or gasoline, say, in water; poly-t-butyl styrene, which may be foamed by employing wet granules of the polymer and molding, for organic and/or oleaginous target substances such as a hexane, a heptane, oil, and so forth; polymethylmethacrylate for more polar organics, say, a lower alcohol, vinyl acetate, acrylates or methacrylates such as in a monomer, dimer and so forth state; poly-alpha-methyl styrene for toluene; polyvinyl chloride for tetrahydrofuran; foamed ethyl cellulose for acrylonitrile (vinyl cyanide); and so forth and the like. A mixture of such polymers for or in the restrainer 2, which are compromised by different target substances 1 or the same target substances 1 at different levels, and which may be thermoplastic, may be employed. The restrainer 2 may have oriented cell walls; it may be or include a reticular foam as a first component, which may be considered to be a macro-reticular foam, for example, made of a soft or resilient plastic having "struts" such as found otherwise with a material for an air conditioner filter, which may have about from fifty to one hundred fifty, say, one hundred pores per square inch and which would form a reticular foam core or skeleton to be coated with a second component, say, a rigid polymer such as polystyrene, poly-t-butyl styrene, polymethylmethacrylate, polyvinylchloride, and so forth, to provide reliable structural integrity when no target is present and in contact with the same, and reliable compromise ability when contacted by the target substance 1, with a thin coat of the rigid polymer sufficient to provide for the structural integrity as well as a rapid softening or dissolution for a rapid response; it may be a soft natural or synthetic textile fabric as a core provided with a rigid polymer coat akin to that found for the reticular foam; and/or it may have another form. A spring, gravity acting upon a mass, magnetism, and so forth and the like, may provide bias to member 3. The switch, upon compromise, may employ electricity to trip a visual, audio, vibrational or other type of alarm, or to signal a computer. The switch may have a microswitch component. The switch may be coated with an oil-resistant rubber to keep a member 3 free, say, in a microswitch configuration, and, of course, with keen of its electric contacts dry. Protective housing 4 such as a cage having a stainless steel screen for land use or a copper screen for water use, through which the target substance 1 can pass, may surround in whole or part, the switch with its restrainer 2 and member 3.

The compromise of the restrainer 2 can activate the instant sensor switch by closing an electrical circuit (FIGS. 1, 2, 4 and 5) or opening it (FIG. 9) that is in communication with a signal, for example, light and/or sound, as a predetermined choice of configuration. Additional configurations are possible as well. For example, to a restrainer 2 can be suspended a member 3 in a form of a weight such that, when the restrainer 2 is compromised, the weight disrupts an optical fiber (FIG. 3); a magnet can act upon an iron (Fe) member 3, between which is interposed a restrainer 2 (FIG. 4). The restrainer 2 and member can be any suitable size. For example, the restrainer 2 may be a foamed polystyrene "plug," which could be small, say, about one-half an inch in diameter by three-fourths of an inch in height, or large, say, about four inches in diameter by about four inches in height (FIG. 6); such a foamed polystyrene "plug" may have holes bored through it, say, for water to pass through and easier and more rapid compromise (FIG. 7). Also as alluded to, the restrainer 2 may have a reticular foam or fabric core to which is added a thin coat of rigid polymer to correspond to predetermined target(s) (FIG. 8). The instant switch may be of light weight and density so as to float on water, for example, behind a boom to indicate failure of the boom (FIGS. 5 and 10). It may have a weight associated with it to keep it oriented in a specific manner when floating, and may be provided with a housing, which itself may be of light weight and density for floating and for keeping the unit in the desired orientation while floating, which would not be needed for ground and pipe line applications, and provided with a screen, for example, of copper (Cu) for use in aquatic environments and to pass water or floating oil through to the instant switch for monitoring and detection of any target substance(s) (FIG. 10).

The compromise sensor switch may be placed near or be attached to liquid spill absorbing contrivances such as beads, booms, blankets, drains, and so forth and the like. Otherwise, it may be employed apart and separate from such contrivances.

CONCLUSION TO THE INVENTION

The instant invention is thus provided. Numerous feature(s), part(s), step(s), subcombination(s) and/or combination(s) can be employed with or without reference to other feature(s), part(s), step(s), subcombination(s) and/or combination(s) in the practice of the invention, and numerous adaptations and modifications can be effected within its spirit, the literal claim scope of which is particularly pointed out as follows:

What is claimed is:

1. A sensor switch for chemical/composition detection, which comprises a compromisable mechanical restrainer, a biased first member, and a second member, wherein:

before compromise, the restrainer can hold the biased first member in a first position, and, upon contact with a target chemical and/or composition, the restrainer is physically compromised by being softened or dissolved such that the biased first member can assume a second position different from the first position to make or break contact with the second member; and the sensor switch operates only by an all-or-none, "open/close" configuration feature such that when the first position provides for the "open" configuration, direct physical contact between the biased first member and the second member is not present, which could be closed by making contact of the biased first member with the second member; and when the first position provides for "close" configuration, direct physic contact between the biased first member and the second member is present, which could be opened by breaking contact of the biased first member with the second member.

2. The sensor switch of claim 1, wherein the restrainer includes a foamed plastic.

3. The sensor switch of claim 1, wherein the restrainer includes a soft reticular plastic core having a coat of a rigid polymer sensitive to the target chemical and/or composition.

4. The sensor switch of claim 2, wherein a microswitch is employed.

5. The sensor switch of claim 3, wherein a microswitch is employed.

6. The sensor switch of claim 1, which further comprises a housing about the sensor switch, which has a screen for access of the target chemical and/or composition.

7. The sensor switch of claim 6, wherein the housing is weighted about a bottom thereof, and the screen is made to be or include copper.

8. A method for monitoring a sample for a target chemical and/or composition, which comprises the following steps, which are not necessarily conducted in series:

providing a sensor switch for chemical/composition detection, which comprises a compromisable mechanical restrainer, a biased first member, and a second member, wherein:

before compromise, the restrainer can hold the biased first member in a first position, and, upon contact with a target chemical and/or composition, the restrainer is physically compromised by being softened or dissolved such that the biased first member can assume a second position different from the first position to make or break contact with the second member, wherein the sensor switch has the restrainer in the first position before compromise; and the sensor switch operates only by an all-or-none, "open/close" configuration feature such that when the first position provides for the "open" configuration, direct physical contact between the biased first member and the second member is not present, which could be closed by making contact of the biased first member with the second member; and when the first position provides for the "close" configuration, direct physical contact between the biased first member and the second member is present, which could be opened by breaking contact of the biased first member with the second member; and introducing the sensor switch to the sample such that, when contacted with a target chemical and/or composition, the restrainer is physically compromised by being softened or dissolved such that the biased member assumes the second position different from the first position for detection of the target chemical and/or composition.

9. The method of claim 8, which is conducted in water.

10. The method of claim 9, wherein the sensor switch floats in the water.

11. A sensor switch for chemical/composition detection, which comprises a compromisable mechanical restrainer, a biased first member, and a second member, wherein:
- before compromise, the restrainer can hold the biased first member in a first position, and, upon contact with a target chemical and/or composition, the restrainer is physically compromised by being softened or dissolved such that the biased first member can assume a second position different from the first position to make or break contact with the second member;
- the sensor switch operates only by an all-or-none, "open/close" configuration feature such that when the first position provides for the "open" configuration, direct physical contact between the biased first member and the second member is not present, which could be closed by making contact of the biased first member with the second member; and when the first position provides for the "close" configuration, direct physical contact between the biased first member and the second member is present, which could be opened by breaking contact of the biased first member with the second member; and
- at least one of electricity and light is employed in conjunction with the "open/close" configuration feature.

12. The sensor switch of claim 11, wherein the electricity is employed in conjunction with the "open/close" feature such that when the "open" configuration is present an electrical circuit is not made between the biased first member and the second member, and when the "close" configuration is present an electrical circuit is made between the biased first member and the second member; and the first position of the biased first member does not make contact with the second member to provide the "open" configuration until the second position different from the first position is assumed, upon which the first biased member makes contact with the second member to provide the "close" configuration.

13. The sensor switch of claim 11, wherein the electricity is employed in conjunction with the "open/close" feature such that when the "open" configuration is present an electrical circuit is not made between the biased first member and the second member, and when the "close" configuration is present an electrical circuit is made between the biased first member and the second member; and the first position of the biased first member makes contact with the second member to provide the "close" configuration until the second position different from the first position is assumed, upon which the first biased member breaks contact with the second member to provide the "open" configuration.

14. The sensor switch of claim 11, wherein the second member comprises an optical fiber, and the light in the optical fiber is employed in conjunction with the "open/close" feature such that when the "open" configuration is present light passes from one position to another in the optical fiber, and when the "close" configuration is present the biased first member assumes the second position different from the first position to make contact with, and disrupt the optical fiber, and the light passing therein.

15. The sensor switch of claim 11, wherein bias in the biased first member is provided by at least one of a spring, a magnet, and gravity.

16. The sensor switch of claim 11, wherein the restrainer includes a foamed plastic.

17. The sensor switch of claim 11, wherein the restrainer includes a soft reticular plastic core having a coat of a rigid polymer sensitive to the target chemical and/or composition.

18. The sensor switch of claim 12, wherein the restrainer includes a soft reticular plastic core having a coat of a rigid polymer sensitive to the target chemical and/or composition.

19. The sensor switch of claim 13, wherein the restrainer includes a soft reticular plastic core having a coat of a rigid polymer sensitive to the target chemical and/or composition.

20. The sensor switch of claim 11, wherein a microswitch is employed.

* * * * *

UNITED STATES PATENT AND TRADEMARK OFFICE
CERTIFICATE OF CORRECTION

PATENT NO. : 8,627,711 B1  
APPLICATION NO. : 13/068468  
DATED : January 14, 2014  
INVENTOR(S) : Richard H. Hall and Daniel F. Hall Page 1 of 1

It is certified that error appears in the above-identified patent and that said Letters Patent is hereby corrected as shown below:

In the Specification

In column 3, line 6, the word, "keen," should read, "keep."

Signed and Sealed this
First Day of April, 2014

Michelle K. Lee
*Deputy Director of the United States Patent and Trademark Office*